Sept. 14, 1965          H. W. BOTELER                3,206,530
               METHOD OF FORMING A LINED CONDUIT
Original Filed April 21, 1961                    3 Sheets-Sheet 1

INVENTOR.
HENRY W. BOTELER
BY David D. McKenney
ATTORNEY

INVENTOR.
HENRY W. BOTELER
BY David D. McKenney
ATTORNEY

INVENTOR.
HENRY W. BOTELER
BY David D. McKenney
ATTORNEY ately 3,206,530
METHOD OF FORMING A LINED CONDUIT
Henry W. Boteler, East Greenwich, R.I., assignor to Grinnell Corporation, Providence, R.I., a corporation of Delaware
Continuation of application Ser. No. 115,753, June 8, 1961, which is a continuation of application Ser. No. 111,888, Apr. 21, 1961. This application Nov. 29, 1963, Ser. No. 328,155
5 Claims. (Cl. 264—269)

This application is a continuation of my copending application Serial No. 115,753, filed June 8, 1961, which is now abandoned and which is a continuation of application Serial No. 111,888, filed April 21, 1961, which is also now abandoned.

This invention has to do with improvements in lined pressure containers and conduits such as diaphragm valve bodies. More particularly it has to do with method and means for providing a container such as a diaphragm valve body having a liner in which gaps between the body housing and the liner are filled with supporting filler material to prevent pressure of the controlled fluid from rupturing the liner.

Valves of the diaphragm type are especially well suited for the control of corrosive fluids because in addition to the isolation of the fluid from the actuating mechanism by the diaphragm, the body has a flow passageway which lends itself particularly well to being lined with corrosion resistant materials.

Thus, for example, a diaphragm valve body is usually formed from cast metal as the most inexpensive structure which will provide adequate strength to withstand the fluid pressures and is essentially a cylinder with a diaphragm opening on one side thereof and a diaphragm seating on the interior surface of the body opposite the opening. In most instances this seating is in the form of a weir extending toward the diaphragm opening with a concave surface thereon in the form of a band across the diaphragm opening. The flow passageway from one end opening in the body curves up over this weir and down the other side to the other end opening, thus forming a concave cavity on either side of the weir. The diaphragm is adapted to be clamped to the body around the diaphragm opening and is itself concaved so that when withdrawn from the weir the fluid can flow over the weir between it and the diaphragm and when pressed against the weir the fluid flow is stopped.

In general the cast metals are not very corrosion resistant, and materials which are highly corrosion resistant are relatively expensive. As a result it is not always feasible to form the body entirely from such corrosion resistant materials, and this is particularly true in the larger sizes of valves where the corrosion resistant materials may not provide adequate strength. Accordingly, the practice has been to form diaphragm valve bodies of cast metal body housings in which the passageway is enlarged on all sides by the thickness of a corrosion resistant liner which is either molded into the cast metal body housing or adapted to be formed separately and inserted into such body housing to achieve a complete body.

In either case the difficulty has been that the finished liner does not always exactly fit the metal body housing which it lines with the result that gaps or spaces occur between the liner and the interior body housing surface. For example, when the liner is molded in the valve body housing, shrinkage of the liner material during cooling, and with some materials for a period of time thereafter, will cause the liner to pull or draw away from the body housing in the aforementioned concave cavities, or in curved portions of any similarly shaped conduit having a curved flow passageway. Also, it will be appreciated that where the liner is made separately from the cast metal body housing it is impractical to achieve an exact fit between the liner and body housing.

If the liner material were very elastic the gaps thus occurring between the liner and lined body housing would not present a problem because fluid pressure in the passageway during use of the valve could bulge the liner out against the body housing which would then support it and prevent further the bulging which might rupture the liner material. The difficulty, however, is that the liner material is often sufficiently inelastic so that it will not move through the gaps referred to even when such gaps are quite small, and consequently the fluid pressure in the passageway will rupture the liner in the unsupported regions adjacent the gaps.

The present invention has to do with a method of forming a lined pressure container or conduit involving injecting into any gaps between the container and its liner a flowable material which, after injection, supports the liner against pressure in the lined container and thereby prevents liner rupture. The invention also has to do with a lined container or conduit in which gaps existing between the container and liner are filled with a liner-supporting material.

In an example of a practice of the method a cast iron body housing for a diaphragm valve of the weir type has a polytetrafluoroethylene liner molded therein of such shape that it conforms to the interior surface of the body housing. During cooling, however, a gap has appeared between the liner and the cast iron as a result of liner shrinkage so that the liner now only approximately conforms to the interior shape of the body housing. The body housing is provided with an injection opening through the cast iron body housing wall adjacent such gap, and a liquid filler material, for example, a material which is flowable under moderate pressure and which will harden by hydration or polymerization, is injected under pressure through such opening to fill such gap and is permitted to harden therein whereby the liner is supported by the cast iron directly through the hardened filler material. The result of such practice of the method is an example of the means of this invention.

Accordingly, one object of the present invention is to provide an improved method of forming a lined pressure container or conduit such as a diaphragm valve body in which a liner-supporting filler material is inserted in a gap between the container and the liner.

Another object is to provide an improved method as described in which the liner is first located within the container and a liner-supporting material is then inserted through the container into a gap between the container and the liner.

Another object is to provide an improved methd as described in which the liner is first molded against the interior surfaces of the container walls and a flowable liner-supporting filler material is then injected under pressure through an opening in the container wall into a gap between the container and the liner.

Another object is to provide an improved lined pressure container or conduit such as a diaphragm valve body having a liner-supporting filler material inserted in a gap between the container and liner.

Another object is to provide an improved method of forming lined pressure containers or conduits such as diaphragm valve bodies which method is simple and inexpensive to practice, requires a minimum of equipment and is suitable for lined pressure containers and conduits having a wide variety of shapes.

Another object is to provide an improved lined pressure container which is easy and inexpensive to manufacture and in which rupture of the liner by pressure is prevented.

Other objects will be apparent from the following description.

The best mode in which I have contemplated applying the principles of the invention are shown in the accompanying drawings, but these are to be deemed primarily illustrative for it is intended that the patent shall cover by suitable expression in the appended claims whatever of patentable novelty exists in the invention disclosed.

Figure 1:
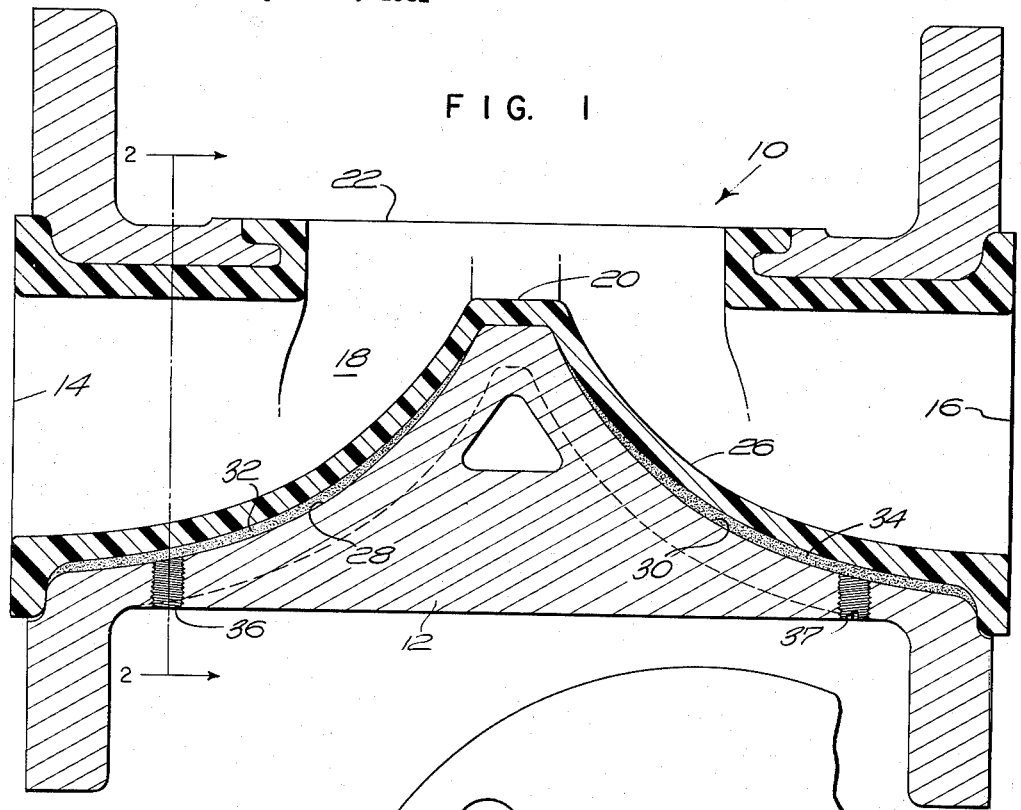
FIG. 1 is a side elevational cross-sectional view of one embodiment of the present invention.
Figure 2:
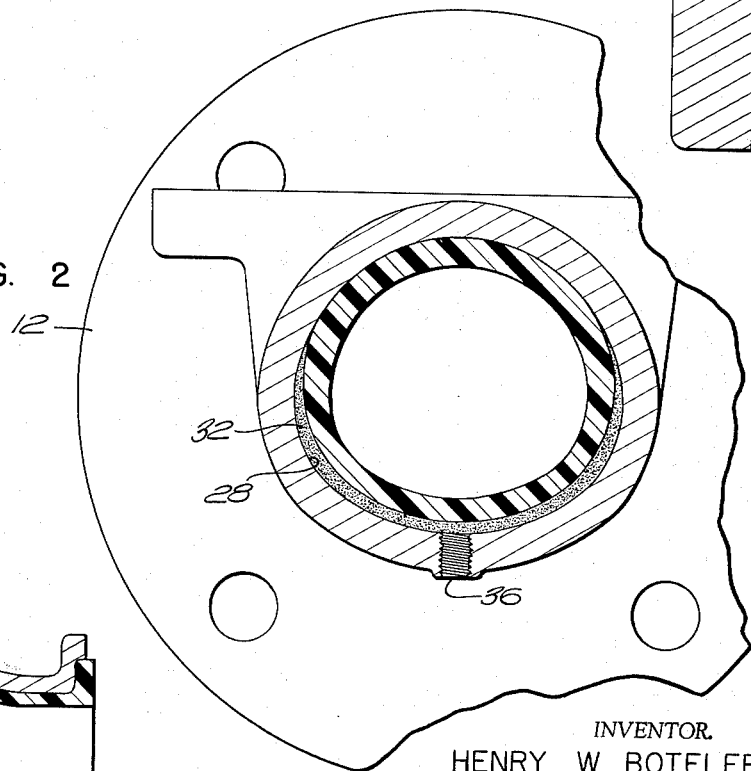
FIG. 2 is a cross-sectional view on the line 2—2 of FIG. 1.

Referring now to FIGS. 1 and 2 it will be seen that a diaphragm valve body 10 consists of a generally tubular valve body housing 12 which is open at its ends 14 and 16 and has a curved flow passageway 18 therethrough for a liquid to be controlled. Intermediate the ends 14 and 16, the interior surface of the housing is interrupted on one side by an inwardly extending weir or seating 20 over which the controlled fluid must pass. A diaphragm opening 22 is located in a wall of the housing opposite the weir and is adapted to be closed by a diaphragm (not shown) which can be pressed into engagement with the weir to block the flow passageway and hence stop the flow of controlled liquid.

The surface configuration of the interior housing passageway portion between one of the ends 14 or 16 of the housing and the weir 20 is defined by having this surface intersect a plane along a curved line, which plane is parallel to the flow passageway 18, passes through the center of the diaphragm opening and is perpendicular to the plane thereof. Thus a concave cavity is formed in a portion of the interior housing passageway surface area between the weir and each of the ends 14 and 16.

Figure 3:
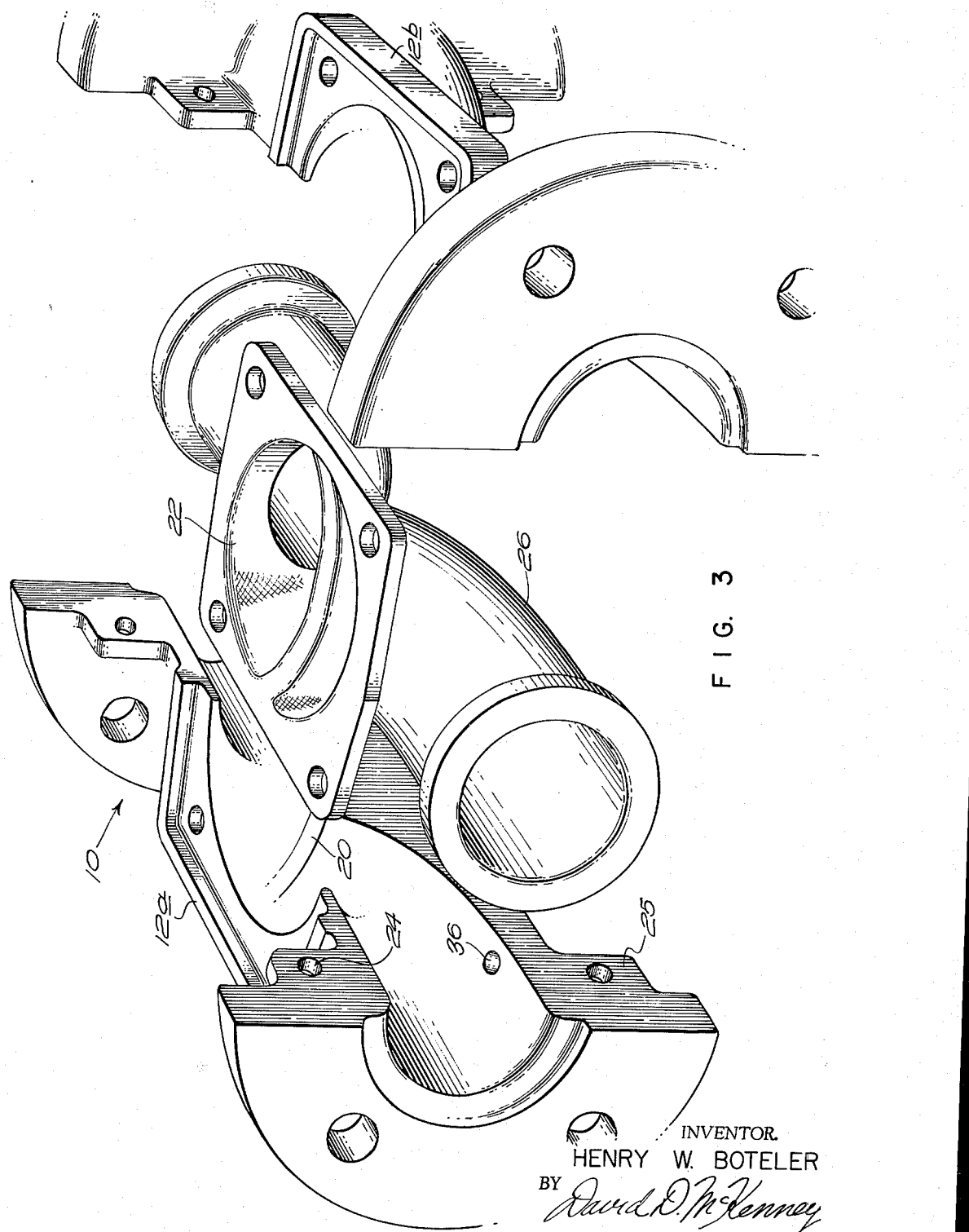
FIG. 3 is an isometric exploded view of another embodiment of the invention.

In a preferred embodiment, the entire housing 12 is a single metal casting. In another embodiment shown in FIGS. 3–5 the housing is in the form of two cast half sections 12A and 12B, as best seen in FIG. 3. These two half sections are joined to form an integral housing 12 by means of bolts 23 secured through bolt holes 24 formed in housing lugs 25 conveniently located as shown in FIGS. 3–5.

For either embodiment, in order to protect the housing 12 from the effects of corrosive liquids passing through the valve body, a liner 26 formed of a substantially corrosion resistant material is provided. One such material which is desirable is polytetrafluoroethylene sold under the trade name of "Teflon" and produced by the Du Pont Chemical Co.

Figure 4:
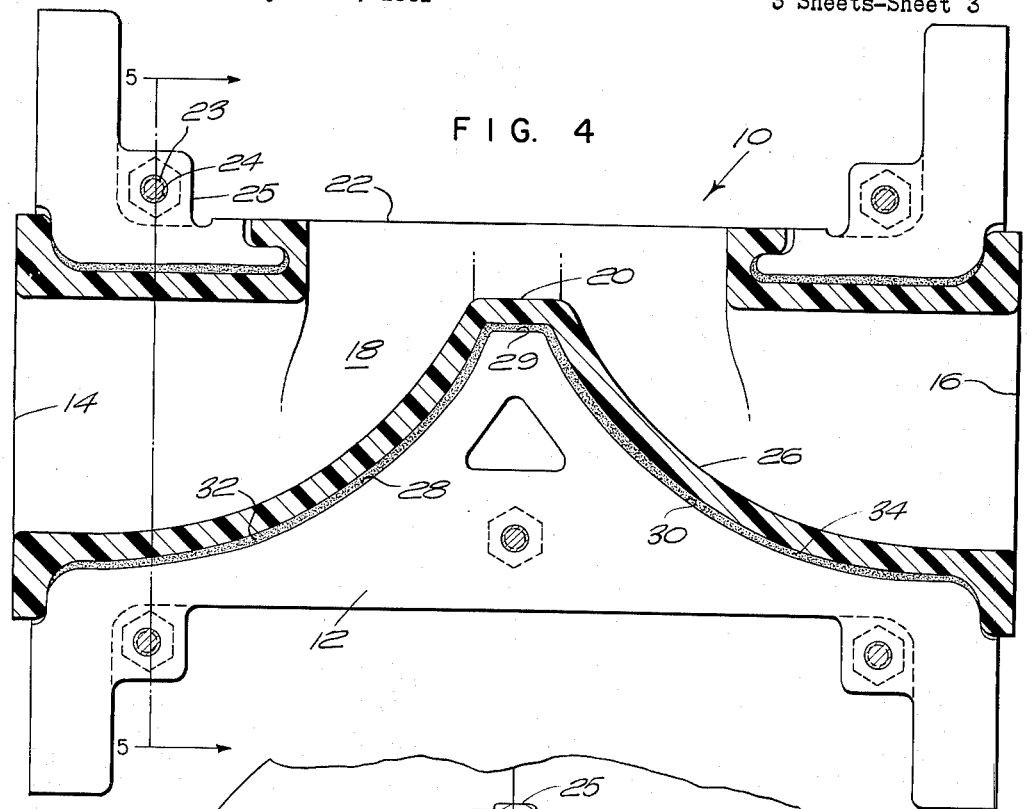
FIG. 4 is a partially cross-sectioned elevational view similar to FIG. 1 of the body shown in FIG. 3.
Figure 5:
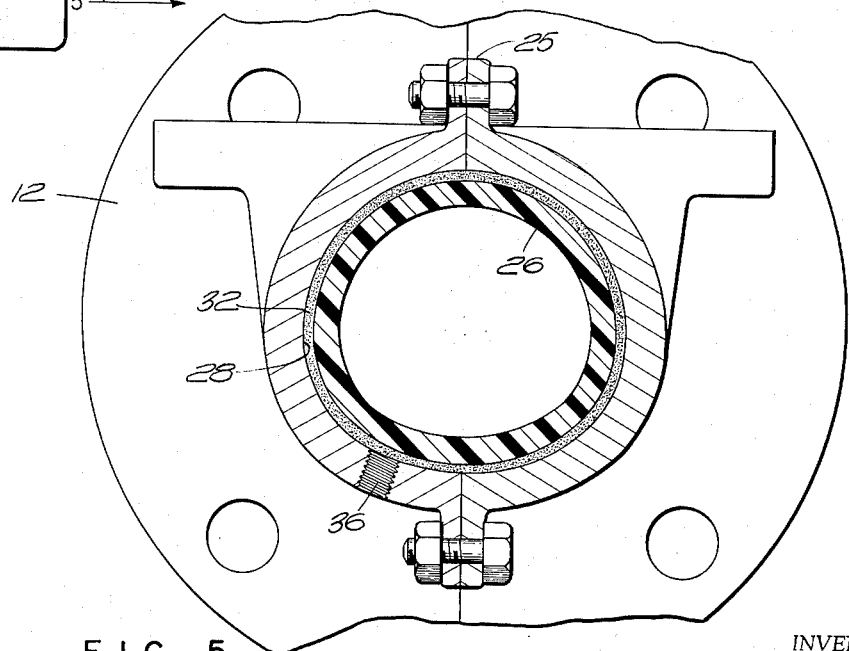
FIG. 5 is a cross-sectional view on the line 5—5 of FIG. 4.

The liner 26 is produced in the embodiment of FIGS. 1 and 2 by molding the corrosion resistant material in the valve body housing 12, or, in the embodiment of FIGS. 3–5, by forming it separately from the housing 12 and inserting it between the two halves 12A and 12B of the housing. By far the most beneficial use of the invention is in the molded case. In either event it is very likely that the finished liner will not exactly fit the valve body housing to the extent that gaps or spaces may occur between the liner 26 and the housing 12.

Figure 6:
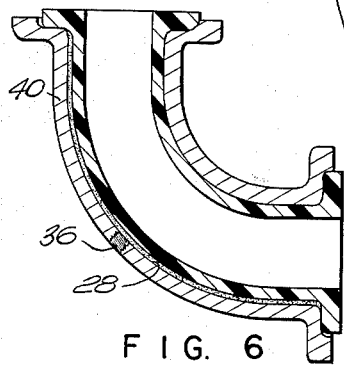
FIG. 6 is a cross-sectional side elevational view of a section of curved conduit or pipe and illustrates the principles of the invention applied thereto.

These gaps may occur in two ways; firstly, if the liner 26 is molded in the valve body housing 12, shrinkage of the liner material during cooling results in a pulling or drawing away of the liner material 26 from the housing 12 in the hollows of curves, as clearly seen in FIGS. 1 and 6 in the areas indicated as 28 and 30. Hence, the liner is left unsupported in these regions. Secondly, if the liner is formed separately from the housing and later surrounded thereby, it is very unlikely that an exact fit between the liner and housing will result over the entire area of the liner, and, in fact, in order to prevent the liner from being too large for the housing with the result that the liner might be crushed when the housing is clamped therearound, it is desirable to purposely make the liner somewhat smaller than an exact fit, as a consequence of which gaps will again be left between the liner and the housing which will leave the liner unevenly supported. In this case these gaps are not limited to the hollows of the curves but might occur anywhere or everywhere such as the space 29 of FIG. 4 in addition to the spaces 28 and 30.

As briefly mentioned above, the liner 26 is made from a substantially inelastic material which will not bulge appreciably when pressure is applied thereto without rupturing. The result of such pressure is rupture of the liner when the gap is substantial. Experience has shown that without a curved conduit, many liners don't pull far enough away to be ruptured by pressure. The reason for this is that mere radial shrinkage is insignificant because it is so much less than lengthwise shrinkage. However, with a body of the configuration as seen in FIGS. 1 and 6, the liner is left unsupported in the indicated curved regions. However, I have discovered that if a flowable, filler material is inserted into the gaps or spaces and permitted to harden therein, the liner will then be sufficiently evenly supported that it can withstand the pressures commonly encountered in controlled liquid lines without rupture or other similar injury. The filler material must be sufficiently incompressible, as distinguished from a readily compressible gaseous material, so that it will support the liner under pressure with practically no yielding of the filler material. Also, the filler material is desirable of a type which will harden at least to the extent that it becomes substantially non-flowable, although it need not absolutely solidify.

One procedure for inserting the filler material into the aforementioned spaces in accordance with the present invention is by way of injection of this material through the valve body housing. Thus, the valve body housing 12 is provided with one or more openings 36 through the wall thereof, which openings communicates with the spaces to be filled. These openings, as a practical matter, are provided in the housing 12 prior to the insertion therein of any liner material, thus eliminating the possibility of injuring the liner or destroying its imperviousness by accidentally drilling into the liner material if the openings 36 were formed after placing the liner material in the housing. The openings are closed off by plugs 37 to prevent the liner material from escaping when the liner material is injected under presure. The openings 36 are provided at locations on the valve body wall where it is anticipated, or experience shows, that a gap or space will form.

For example, it is known that gaps will form in the areas indicated as 28 and 30, respectively if the liner is molded in the valve body housing as shown in FIGS. 1 and 2. These gaps are due to shrinkage of the plastic Teflon material when it cools. Hence the openings 36 will be provided so as to communicate with these gaps through the valve body housing.

The filler material to support the liner is generally of a flowable and substantially incompressible nature when initially prepared and is used in the manner indicated below. It should harden after insertion. It is injected through the opening 36 by any convenient means, after which the opening may be closed off by a plug 37. It is injected in sufficient quantity and under sufficient pressure to cause it to flow into substantially all portions of the gaps or spaces existing between the liner and the interior housing wall. However, care must be exercised in controlling the application of pressure to prevent the liner from being bulged inwardly. Also, injection of the filler material under too high a pressure sometimes results in the material being forced out of the ends of the housing where the liner should remain in contact with the housing. Thus, by carefully controlling the quantity of material injected, and the application of pressure thereto, the filler material will be filled within the gaps or spaces.

After a given interval of time, the filler material will have set and will thereafter provide a firm support for the liner 26 over the areas filled. Thus the liner will be adequately supported throughout its entire area and will not tend to bulge out under pressure; consequently it will not rupture when pressure is applied thereto.

*Example*

An example of a specific practice of the method of this invention is as follows: A metal valve body housing for a three-inch diaphragm valve was made in the form of a casting to the desired shape in the same manner as if it were to be used without a liner except that the casting was provided with recesses on all interior dimensions substantially equal to the thickness of the liner to provide adequate room for the liner within the housing, thereby maintaining the same interior dimensions with the liner as existed without the liner. FIGS. 1 and 2 illustrate such a housing which is designated with the numeral 12. After the casting was fully formed, holes 36 for the injection of the liner supporting filler material were drilled in the casting at the locations shown. These holes were then tapped, and threaded plugs were inserted therein. Care was taken to assure that the inner end of the plugs were flush with the interior surface of the casting and that there were no sharp projections or burrs on the plugs which might later injure the liner or interfere with the forming thereof.

The housing was then prepared for the liner material by inserting mandrels in the housing which mandrels together with the housing inner wall, formed cavities for the liner material. A mandrel was inserted through each opening at the ends of the housing and another mandrel was inserted through the diaphragm opening opposite the weir; these mandrels were then secured together inside the housing to form an integral unit. One or more mandrel passageways were provided which communicated between the cavities for the liner material and an outlet nozzle of an injection apparatus by which the liner material was to be injected through such passageways and into the aforementioned cavities.

In the specific illustration, the liner material before the lining operation consisted of Teflon powder mixed with 20% (by weight) of glass fibers. This mixture was heated to its molding temperature of about 500 degrees F. to render it flowable, and it was then injected under sufficient pressure (believed to be in the neighborhood of 2000 p.s.i.) to cause the material to flow into all parts of the liner cavities and form the desired liner shape. When the liner cavities were completely filled with the heated Teflon and glass mixture the pressure was removed, the injection apparatus was disconnected from the mandrels, and the mandrels were promptly removed from the housing while the Teflon was still hot to prevent any of the Teflon from sticking to the mandrels. The housing was then set aside to permit the liner material to set, i.e., to cool and harden, thereby forming the finished liner.

During the setting period, the plastic liner shrank to a certain extent in accordance with the shrinkage factor (more fully discussed hereinbelow) of the plastic liner material. This shrinkage resulted in gaps or spaces being formed between the liner and the metal housing which left the finished liner unevenly supported.

When this shrinkage had substantially ceased (which occurred within 24 hours after the mandrels were removed) the plugs in the injection holes were removed and a filler was injected into the gaps or spaces between the liner and the metal housing. This material was a preparation of six parts (by volume) of Smooth-on (a product of the Smooth-On Manufacturing Co., of Jersey City, New Jersey) mixed with one part of water. This material was injected at room temperature and at a pressure of about 40 p.s.i. When the gaps were substantially filled, the pressure was relieved and the injection apparatus was removed. The plugs were replaced although this was not necessary because the filler material was sufficiently viscous not to run out before it hardened. The completed valve body housing was then set aside again to permit the filler material to harden or set which occurred within 48 hours. The housing was then ready for testing.

In one test, this valve body housing was assembled with the rest of the valve components and installed in an air pressure line. The housing was subjected to 150 p.s.i. air pressure without damage to the liner.

In a second test the housing was installed in a water pressure line and subjected to pressure as high as 950 p.s.i. without damage.

To illustrate the advantages of the method of the present invention the following is an example of a method of manufacture of a lined valve body housing in accordance with prior methods.

A valve body housing for a three-inch diaphragm was prepared in the manner set forth in the above example except that no holes were provided and no filler material was introduced into the gaps between the liner and the housing. This housing was tested by installing the assembled valve in an air pressure line, and the liner ruptured when the air pressure reached 75 p.s.i. Inspection revealed that the liner had cracked about one half inch down from the weir and parallel thereto. This was well within the area where the liner had pulled away from the housing due to shrinkage thereof and had left a gap between it and the housing. These tests demonstrate that the crack was a result of the liner being unsupported in this area.

Another practice of the method of the present invention, would be to prepare a housing in the manner described in the example except that the holes for the injection of the filler material are not provided in the housing wall. In order to inject the filler material into the gaps between the liner and the housing, suitable holes are drilled or otherwise provided in the liner itself, and the filler material is injected through these holes. When the gaps or spaces are filled, the holes are filled in, usually by cementing or otherwise securing a plug of liner material in the hole. Of course, care must be exercised in this practice of the invention to assure that the liner is as impervious after the injection of the filler material as before the injection thereof.

FIG. 6 illustrates how the principles of this invention may be applied to a section of curved conduit such as a pipe elbow 40 which is to be lined. In this FIG. 6 the appropriate numbers from the earlier figures are used where they apply.

It will be appreciated by those skilled in the art that various materials suited for the liner have different shrinkage factors, and, therefore, will shrink to a different extent. Some examples of suitable liner materials and their approximate shrinkage factor in thousandths of an inch per inch are as follows:

| | |
|---|---|
| Polyvinylchloride | .004 |
| Penton (Hercules Chemical Co.) | .005–.006 |
| Saran (Dow Chemical Co.) | .012–.015 |
| Teflon reinforced with 20% glass fibers | .010–.016 |
| Teflon, pure | .020–.032 |

It should also be noted that the bulk of total shrinkage occurs during the setting period with certain materials while with some other materials some shrinkage may continue for several days.

I claim:
1. A method of forming a lined pressure conduit which comprises the steps of molding within a pressure conduit housing a liner of a material which when heated to molding temperature has an exterior surface fitting the housing interior surface and which when cooled shrinks substantially to have an exterior surface approximately but not accurately fitting said housing interior surface, injecting a flowable incompressible filler material through said housing into gaps which exist due to said shrinkage of said liner between said liner exterior surface and said housing interior surface, said injection of said filler material being of sufficient quantity and under sufficient pressure so as to cause said filler material to flow into and at least partly fill said gaps to thereby bridge said gaps between said surfaces, and confining said material in said gaps, whereby said liner is supported by said filler material in the area of said gaps.

2. A method of forming a lined pressure conduit from a conduit housing having an interior surface defining a flow pasageway therethrough with at least one curved portion and having surface areas at the ends of said curved portion which are at substantial angles to the interior surface of said curved portion, which method comprises the steps of flowing a molten liner material against said curved passageway interior surface portion and against said surface areas in a substantially continuous layer to form a liner, whereby said liner extends along said curved passageway interior surface portion and then abruptly changes direction and extends along said surface areas, said liner material being a material which will shrink when it has been cooled and set, drawing said liner firmly against said surface areas and pulling said liner away from at least one side of said curved passageway interior surface portion by cooling and setting said liner material, whereby at least one enclosed gap is formed between said interior surface of said curved housing passageway portion and the exterior surface of said liner, replacing the part of said liner which occupied said gap with a flowable incompressible filler material sufficient in quantity and under sufficient pressure to cause said filler material to at least partly fill said gap and bridge said gap between said curved passageway interior surface portion and said liner exterior surface and insufficient in quantity and pressure to escape substantially from said gap between said surface areas and said liner drawn firmly thereagainst, whereby said filler material is confined in said gap, and hardening said filler material to a substantially non-flowable state to transmit housing pressure supporting force to said liner through said hardened filler material, whereby said liner is supported by said hardened filler material in the region of said gap.

3. A method of forming a lined pressure conduit which comprises the steps of molding a liner member within a conduit housing member against the interior surface thereof so that said liner member will have an exterior surface corresponding in shape and dimensions to said housing member interior surface, said liner member being molded from a material which will shrink subsequent to said molding of said liner member, said shrinkage resulting in said liner member pulling away from some of said housing member interior surfaces, thereby forming gaps between said liner member exterior surface and said housing member interior surface, forming at least one opening in one of said members in the area of said gaps, injecting a flowable incompressible filler material through said opening in sufficient quantity and under sufficient pressure to cause said filler material to flow into and at least partly fill said gaps to thereby bridge said gaps between said surfaces, confining said filler material in said gaps, and hardening said filler material to a substantially non-flowable state to transmit the supporting force of said housing member to said liner member through said hardened filler material, whereby said liner is supported by said hardened filler material in the area of said gaps.

4. A method of forming a lined pressure conduit which comprises the steps of forming a pressure conduit housing which has an interior surface to be lined, forming at least one aperture through the wall of said housing at a predetermined location, closing said aperture, molding a liner within said housing against said interior surface so that said liner will have an exterior surface corresponding in shape and dimensions to said housing interior surface, said liner being molded from a material which will shrink subsequent to said molding of said liner and which will cause said liner to pull away from said housing interior surface to form gaps between said liner exterior surface and said housig interior surface, opening said aperture, injecting a flowable incompressible filler material through said aperture in sufficient quantity and under sufficient pressure to cause said filler material to flow into and at least partly fill said gaps to thereby bridge said gaps between said surfaces, confining said filler material in said gaps, and hardening said filler material to a substantially non-flowable state, whereby the supporting force of said housing is transmitted to said liner through said hardened filler material, and whereby said liner is supported by said hardened filler material in the area of said gaps.

5. A method of forming a lined diaphragm valve body from a metal body housing having open ends and an interior surface defining a flow passageway through the housing betwen said ends with portions of said surface curving to a weir and with flange surfaces which are at said ends and which are substantially perpendicular to said passageway at said ends, which method comprises the steps of flowing molten polytetrafluoroethylene against said curving interior surface portions, against said flange surfaces and against said weir in a substantially continuous layer to form a liner, whereby said liner extends along each curving interior surface portion and then abruptly changes direction at the ends of said portions and extends along one of said end flanges and across said weir, cooling and setting said molten polytetrafluoroethylene to shrink said liner firmly against said end flanges and weir and to shrink said liner away from at least one side of each curving interior surface portion, whereby an enclosed gap is formed between each curving interior surface portion and the exterior surface of said cooled and set liner, injecting through said metal body housing into said gap a flowable mixture of solid filler particles and liquid in sufficient quantity and under sufficient pressure to cause said filler particles to at least partly fill said enclosed gaps and bridge said gaps between said curving interior surface portions and said liner exterior surface permitting said mixture to harden in said gaps by chemical reaction, whereby said liner is supported against pressure in said body by said solid filler particles in said gaps.

References Cited by the Examiner

UNITED STATES PATENTS 3,093,864   6/63   Waldron et al. _____ 18—36

FOREIGN PATENTS 1,044,271   6/55   France.
1,261,139   4/61   France.
824,403   12/59   Great Britain.

M. CARY NELSON, *Primary Examiner.*